(12) United States Patent
Sing (10) Patent No.: US 12,483,048 B1
(45) Date of Patent: Nov. 25, 2025

(54) SELF-ALIGNING CHARGER INTERFACE FOR A ROBOT

(71) Applicant: Amazon Technologies, Inc., Seattle, WA (US)

(72) Inventor: Samrin Sing, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 615 days.

(21) Appl. No.: 17/934,963

(22) Filed: Sep. 23, 2022

(51) Int. Cl.
*H02J 7/00* (2006.01)

(52) U.S. Cl.
CPC .................... *H02J 7/0042* (2013.01)

(58) Field of Classification Search
CPC .... H01R 13/6315; H02J 7/0042; B60L 53/14; B60L 53/16
USPC ................. 320/107, 109, 113, 115
See application file for complete search history.

(56) References Cited

U.S. PATENT DOCUMENTS

| | | | |
|---|---|---|---|
| 4,588,938 A | 5/1986 | Liautaud et al. | |
| 8,324,585 B2 | 12/2012 | McBroom et al. | |
| 9,010,348 B1 | 4/2015 | Kite | |
| 9,559,461 B1 * | 1/2017 | Diehr .................. | B60L 53/18 |
| 10,399,443 B2 * | 9/2019 | Kwa .................... | H02J 7/0045 |
| 10,644,519 B2 * | 5/2020 | Brady .................. | H02J 7/0044 |
| 11,135,930 B2 * | 10/2021 | Traverso .............. | B60L 53/37 |
| 11,171,448 B2 | 11/2021 | Hirose et al. | |
| 11,552,488 B2 * | 1/2023 | Daily ................... | H01R 13/74 |
| 11,623,539 B1 * | 4/2023 | Brady .................. | H01R 13/6315 |
| | | | 248/70 |

| | | | |
|---|---|---|---|
| 2004/0158357 A1 | 8/2004 | Lee et al. | |
| 2017/0282734 A1 | 10/2017 | Noorani et al. | |
| 2018/0208126 A1 | 7/2018 | Arvidsson et al. | |
| 2019/0059680 A1 | 2/2019 | Fox et al. | |
| 2019/0202064 A1 | 7/2019 | Wolff et al. | |
| 2019/0346852 A1 | 11/2019 | Itozawa | |
| 2019/0380552 A1 * | 12/2019 | Han ..................... | G05D 1/0225 |
| 2020/0249688 A1 | 8/2020 | Caussy et al. | |
| 2020/0269712 A1 | 8/2020 | Kozlovsky et al. | |

(Continued)

FOREIGN PATENT DOCUMENTS

| | | | | |
|---|---|---|---|---|
| CN | 106985695 A | * | 7/2017 | .......... B60L 11/1818 |
| CN | 210156947 U | * | 3/2020 | |

(Continued)

OTHER PUBLICATIONS

U.S. Appl. No. 17/215,777, filed Mar. 29, 2021 titled Charging Deice for Autonomous Ground Vehicle.

*Primary Examiner* — Jared Fureman
(74) *Attorney, Agent, or Firm* — Knobbe, Martens, Olson & Bear, LLP (57) ABSTRACT

A charging interface for a robot includes a support frame and a charging port. The support frame can have an opening extending therethrough. The charging port can be movably coupled to the support frame and have a first portion extending at least partially through the opening. An outer surface of the first portion is spaced from the opening by a gap. The charging port can be movable relative to the support frame between a nested position where the charging port is centered and aligned within the opening and fixed relative to the support frame, and a floating position where the charging port is free to translate and rotate relative to the support frame. The charging port can be biased toward the nested position.

18 Claims, 9 Drawing Sheets

(56) References Cited

U.S. PATENT DOCUMENTS

| | | |
|---|---|---|
| 2020/0375093 A1 | 12/2020 | Matus et al. |
| 2021/0083494 A1 | 3/2021 | Towner et al. |
| 2021/0228039 A1 | 7/2021 | Brouwers et al. |
| 2022/0194245 A1 | 6/2022 | Gonano et al. |
| 2022/0219557 A1 | 7/2022 | Poluboiarinov |

FOREIGN PATENT DOCUMENTS

| | | | |
|---|---|---|---|
| CN | 111231723 A | * | 6/2020 |
| CN | 115101994 A | | 9/2022 |

* cited by examiner

SELF-ALIGNING CHARGER INTERFACE FOR A ROBOT

BACKGROUND

Robots are used in various environments, such as warehouses and fulfillment centers. The robots need to engage charging interfaces to recharge. Typical charging interfaces are fixed and as such do not move when engaged by a robot. In many environments, there are various external factors, such as uneven floors or surfaces, that can cause a misalignment between the robot and charging interface when the robot engages the charging, thus resulting in a misconnection.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

The present disclosure generally relates to self-aligning charger interfaces for use with a robot. The robot can engage the charging interface by driving over a charging interface positioned in a horizontal orientation, for example a charging interface positioned in a floor, or by engaging a charging interface positioned in a vertical orientation, for example a charging interface positioned in a wall. The engagement between the robot and the charging interface may not always be perfectly aligned. Therefore, there is a need for charging interfaces that can account for the potential misalignment during engagement between a robot and a charging interface. As such, a charging interface that allows for translational motion as well as rotational motion is beneficial and provides many advantages. For example, the charging interface can accommodate a robot that is attempting to engage the charging interface on an uneven surface, for example a surface that causes the robot to engage the charging interface at an angle or an off-centered position while also providing the necessary support to position the charging interface in a fixed position when the charging interface is not engaged by the robot. As such, the charging interface can be beneficial in indoor or outdoor environments with imperfect surfaces.

Figure 1A:
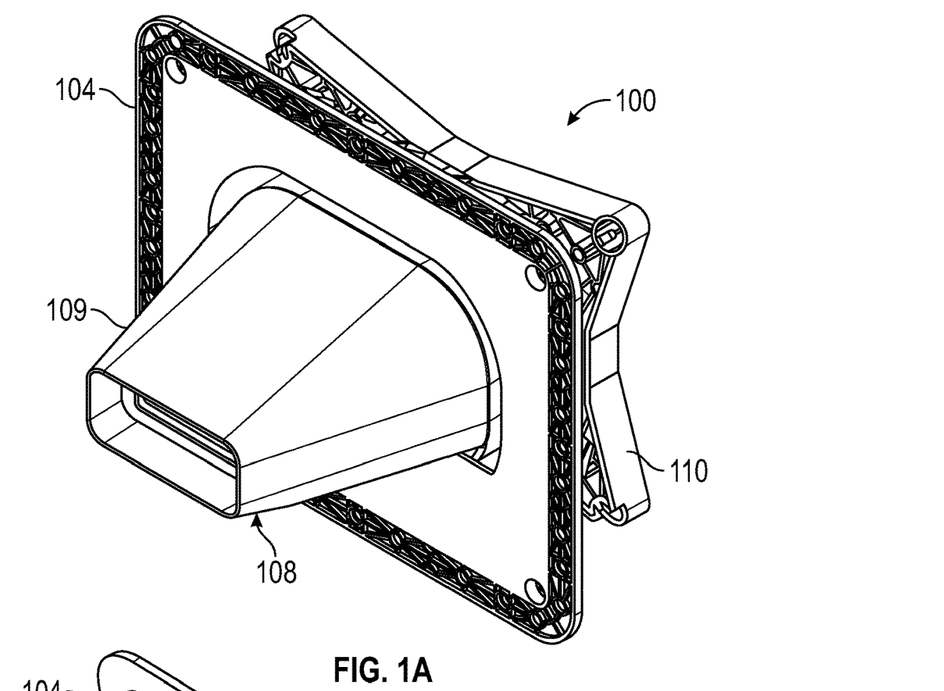
FIG. 1A is a front perspective view of an example embodiment of a charging interface having a support frame and charging assembly.
Figure 1B:
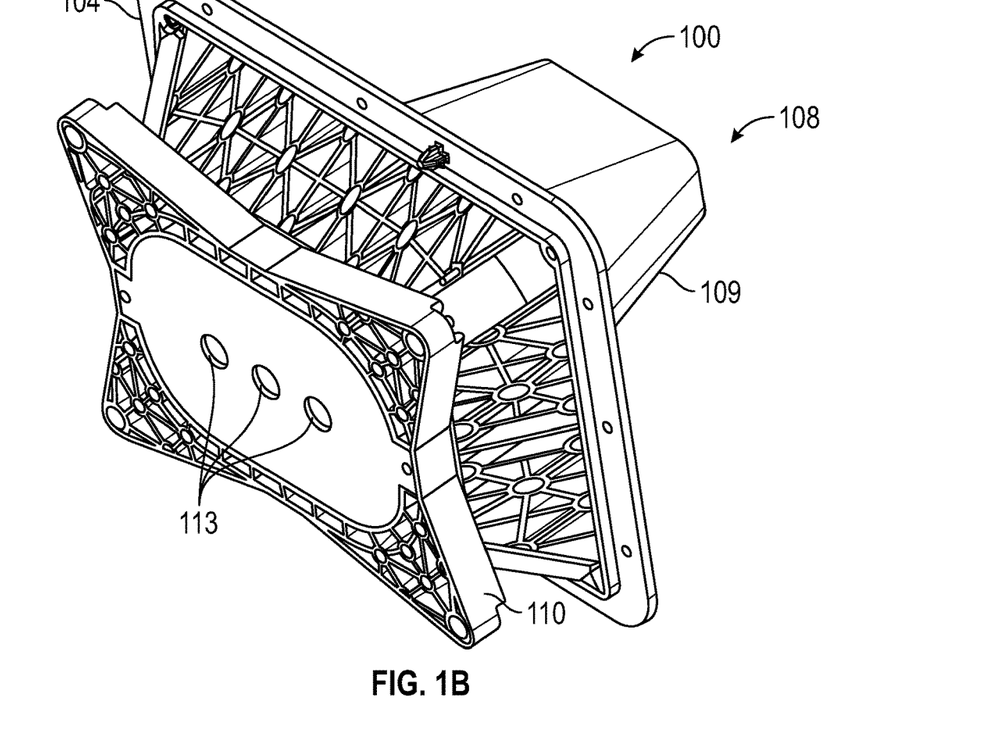
FIG. 1B is a rear perspective view of the charging interface of FIG. 1A.

FIGS. 1A and 1B are perspective views of a charging interface 100 for a robot. The charging interface 100 can self-align with a robot when the robot engages the charging interface 100 for charging. The charging interface 100 can include a support frame 104 and a charging assembly 108. In some embodiments the charging assembly 108 can include a charging port 109 and a fixation member 110 (e.g., end plate). A first end (e.g., proximal end) of the charging port 109 can extend past a front surface of the support frame 104. The charging assembly 108 can be movably coupled to the support frame 104 as described herein. The charging assembly 108 can transition from a nested configuration or position to a floating configuration or position when a robot engages the charging interface 100, as described herein with reference to FIGS. 6A and 6B, and can transition from the floating configuration to the nested configuration when the robot disengages the charging interface 100. The charging assembly 108 can be biased (e.g., resiliently biased) toward the nested configuration, as further discussed below. In some embodiments the charging interface 100 can be electronically coupled with additional electronics (e.g., for data transfer or other connections that do not facilitate charging). Non-limiting examples of data that can be transferred from the robot include mapping data, camera images, sensor data, temperature data, travel recorder data (e.g., torque, speed, variations in temperature, sensor alerts), battery health data, historical charging data, and state of charge. For example, cables connecting additional electronics can be inserted through one or more holes 113 in the fixation member 110, as shown in FIG. 1B.

The charging interface 100 can be made of any suitable material. Non-limiting examples includes plastics and metals. Example methods of manufacturing the charging interface 100 include injection molding, 3D printing, and machining.

The charging interface 100 can be positioned in a vertical or horizontal orientation. When positioned in a vertical orientation, the charging interface 100 can be positioned in a wall or other structure that is positioned vertical to a ground surface. A vertical orientation can allow a side surface of the robot or a charging port extending to a side of the robot to engage the charging interface 100, for example, as shown in FIGS. 7A-7D. When in a horizontal orientation, the charging interface 100 can be positioned in or on a ground surface. A horizontal orientation can allow a bottom surface of the robot to engage the charging interface 100 when the robot drives over the charging interface 100.

Figure 2A:
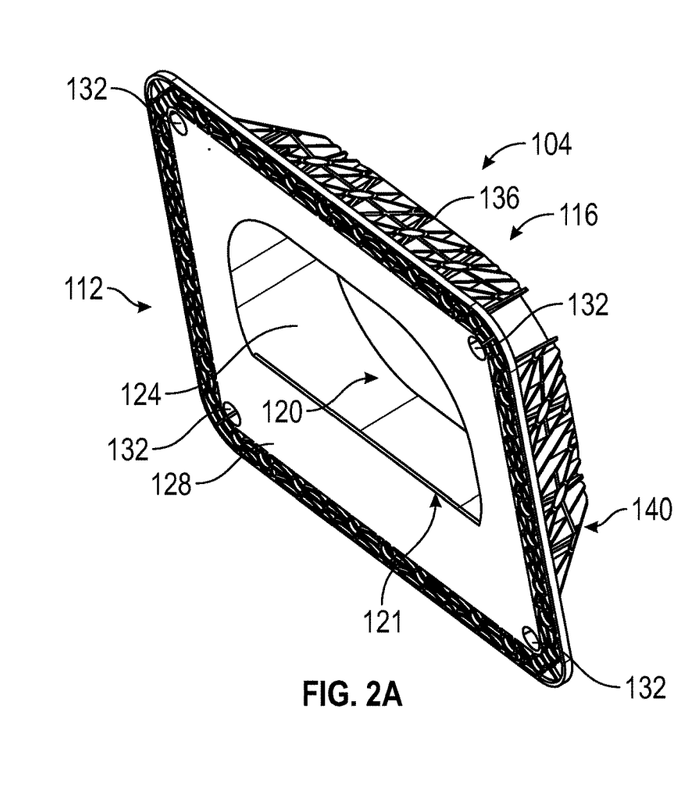
FIG. 2A is a front perspective view of the support frame of FIG. 1A with the charging assembly removed.
Figure 2B:
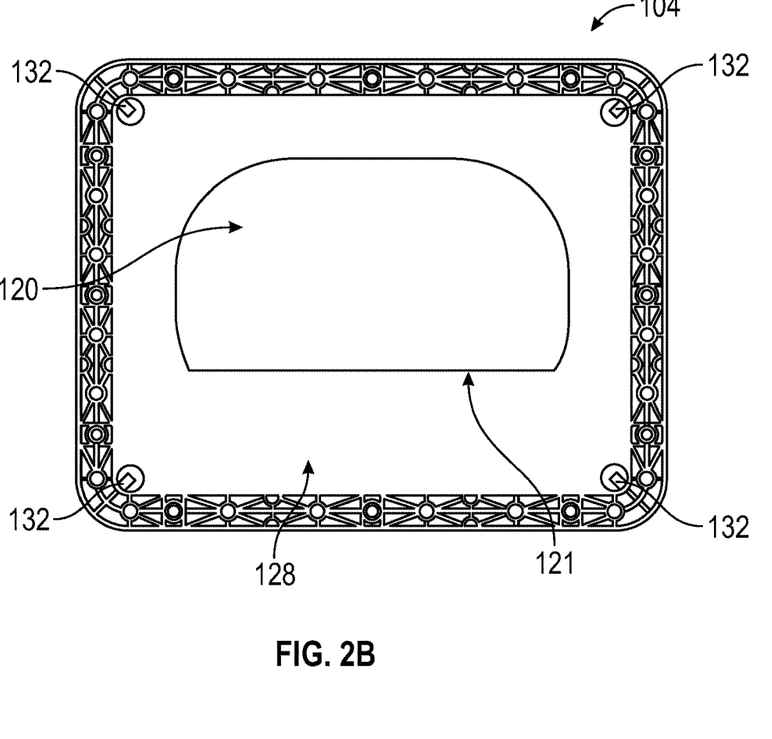
FIG. 2B is a front view of the support frame of FIG. 2A.

FIGS. 2A and 2B are perspective and front views of the support frame 104. The charging assembly 108 has been removed for illustrative purposes. The support frame 104 can extend between a proximal end 112 and a distal end 116. The support frame 104 can have an opening 120 that extends through the support frame 104 from the proximal end 112 to the distal end 116 (e.g., extends completely through the support frame 104). The opening 120 can define an inner surface 124. The opening 120 can receive at least a portion of the charging assembly 108, for example the charging port 109, as described herein. The opening 120 can be sized and shape to correspond to at least a portion (e.g., the charging port 109) of the charging assembly 108. The size of the opening 120 can exceed the size of the portion of the charging assembly 108 inserted therein to allow for freedom of movement when the charging interface 100 is in a floating position relative to the support frame 104.

Figure 4A:
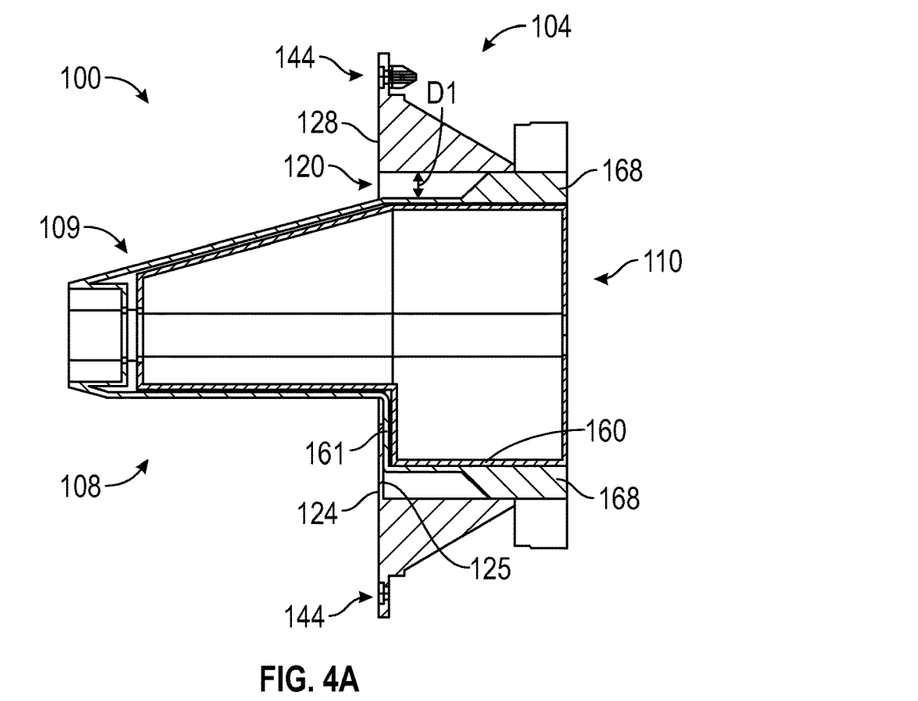
FIG. 4A is a side cross-sectional view of the charging interface of FIG. 1A in a nested configuration.

The support frame 104 can include a front surface or front plate 128. The front surface 128 can be flat or planar and extend around a first end of the opening 120. An enclosed area 121 can extend from a rear surface of the front plate 128, with the opening 120 extending therethrough. The front surface 128 can include through holes 132 that can be used to moveably couple the support frame 104 to the charging assembly 108. The front surface 128 can include additional openings or holes to connect the charging interface 100 to a surface for installation, for example a wall or ground surface. The support frame 104 can extend from the front surface 128 to a rear surface 136. The rear surface 136 can extend around a second end of the opening 120. In some embodiments the rear surface 136 can have a smaller outer perimeter than the front surface 132. As such, a side wall 140 can taper inward when extending from the front surface 132 to the rear surface 136. In some embodiments, the sidewall 140 can extend from a portion of the front surface 128 that is inward from the outer edge such that a flange is defined, for example as shown in FIG. 4A as reference number 144. The through holes 132 can be positioned on the flange.

Figure 3A:
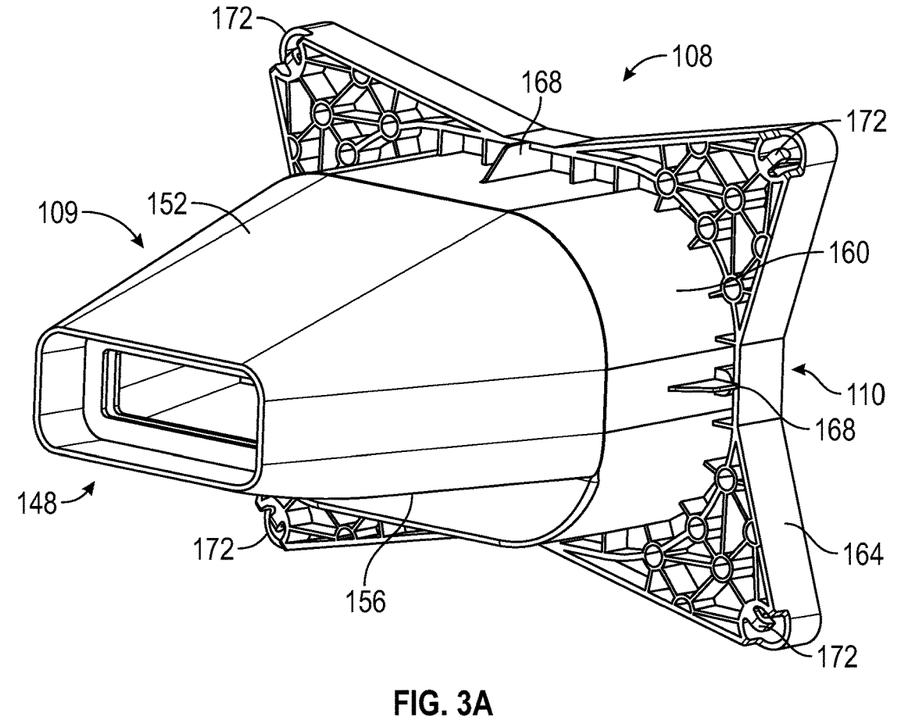
FIG. 3A is a front perspective view of the charging assembly of FIG. 1A with the support frame removed.
Figure 3B:
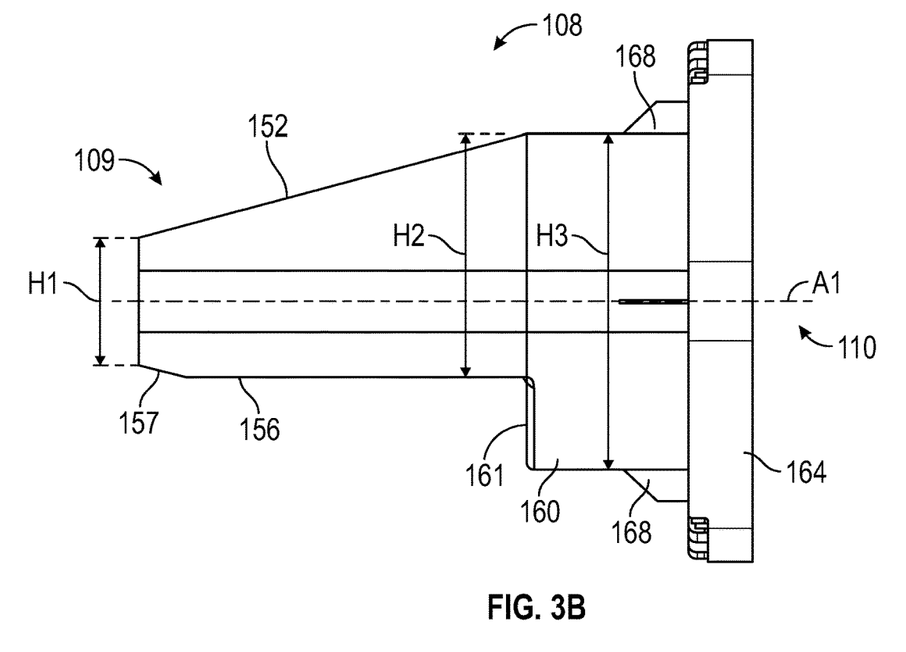
FIG. 3B is a side view of the charging assembly of FIG. 3A.
Figure 5A:
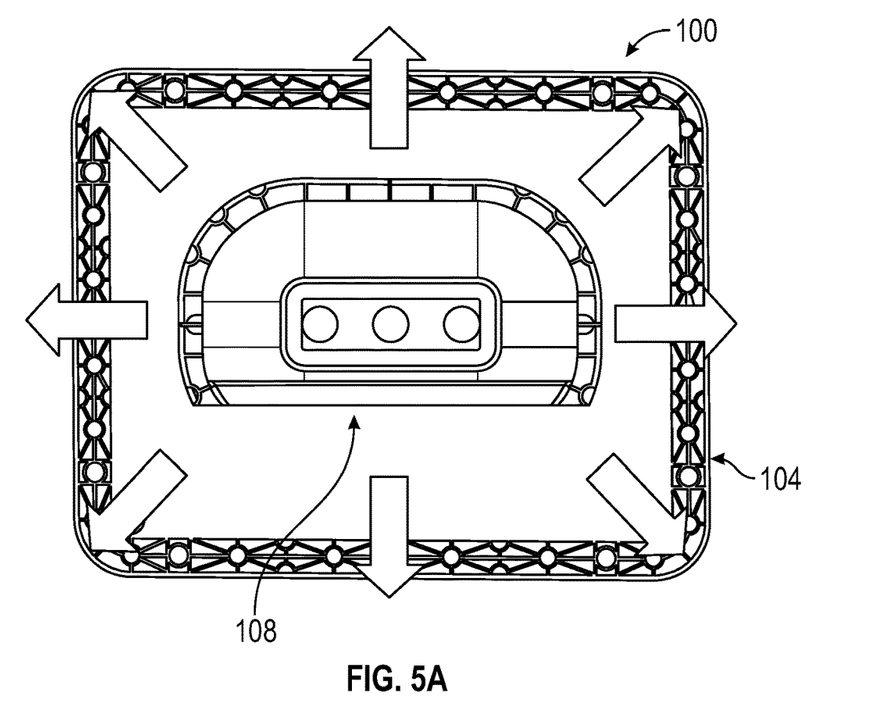
FIGS. 5A and 5B are front views of the charging interface of FIG. 1A illustrating potential movement of the charging assembly.
Figure 5B:
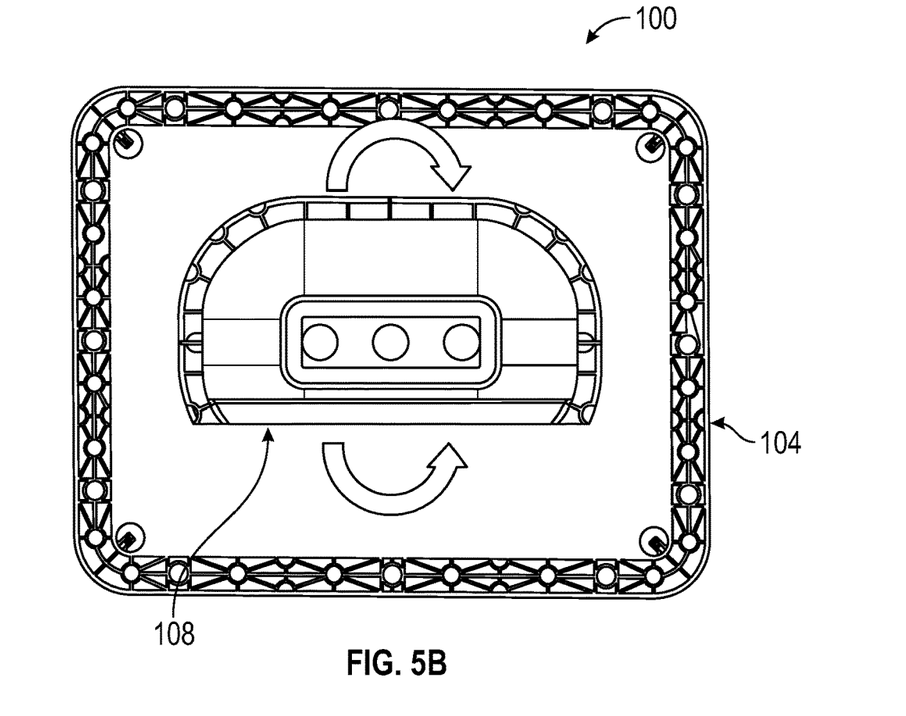

FIGS. 3A and 3B are perspective and front views of the charging assembly 108. The support frame 104 has been removed for illustrative purposes. The charging assembly 108 can include a charging port 109 and a fixation member 110. The charging port 109 can be located at or near a proximal end of the charging assembly 108. The charging port 109 can engage a charging port of a robot to provide power to the robot. In some embodiments, the charging port 109 can include an opening 148 having electrical connection plugs or connections provided therein, for example as shown in FIGS. 5A and 5B.

The charging port 109 can be sized and shaped to correspond to the corresponding connector of the robot. In some embodiments the charging port 109 can have a shape that tapers toward a proximal end of the charging port 109. Described another way, a height H1 of the charging port 109 can gradually increase to a height H2, as shown in FIG. 3B. The tapered shape can allow for an easier initial connection between the charging port 109 and the robot, as the tapered shape will account for some misalignment at the initial engagement between the charging port 109 and the robot.

In some embodiments charging port 109 can have a first surface 152 that is angled relative to a central axis A1 and a second surface 156 that is at least partially parallel to the central axis A1. In some embodiments, the charging port 109 can also have a third surface 157 extending from the proximal end of the charging port 109 to the start of the second surface 156. The angles and lengths of first surface 152 and third surface 157 can be varied to account for greater misalignment. For example, the length of third surface 157 can be increased such that there is no second surface 156 and the difference between H1 and H2 will be increased. The third surface 157 can be angled relative to the second surface 156. The third surface 157 and the first surface 152 can create a taper at the proximal end of the charging port 109. The taper can assist in accounting for any initial misalignment between the robot and charging interface 100. The angled first surface 152, the second surface 156, and/or the angled third surface 157 can create the increase in height from H1 to H2. The first surface 152 and the second surface 156 can extend from the proximal end of the charging port 109 to a first portion 160 of the fixation member 110.

The first portion 160 of the fixation member 110 can extend generally perpendicular from a second portion 164 (e.g., extend linearly). The first portion 160 can have an outer perimeter that is sized to fit within the opening 120 of the support frame 104 as described herein. The first portion 160 can be smaller (e.g., have an outer perimeter or width that is smaller) than the opening 120. In some embodiments, the first portion 160 can have one or more ribs 168. The one or more ribs 168 can extend outward from the surface of the first portion 160 and be spaced around the perimeter of the surface of the first portion 160. The one or more ribs 168 can correspond to one or more recesses of the support frame 104 as described in more detail below. In some embodiments, the ribs 168 extend from the inner surface 124 of the opening 120 of the support frame 104 and the first portion 160 of the fixation member 110 can have corresponding recesses. In some embodiments, both the first portion 160 and the inner surface 124 can have a mix of ribs 168 and corresponding recesses. Stated another way the first portion 160 can have one or more ribs 168 and one or more recesses and the inner surface 124 of the opening 120 of the support frame 104 can have one or more ribs 168 and one or more recesses.

The first portion 160 can have a height H3 that is greater than the maximum height H2 of the charging port 109. The height H3 can extend beyond the height H2 of the charging port 109 forming a vertical surface 161. The vertical surface 161 can act as a stop surface that engages the support frame 104 when in a nested configuration as shown in FIG. 4A. For example, the vertical surface 161 can engage a rear surface 125 of the front surface 124 of the support frame 104.

The second portion 164 of the fixation member 110 can extend past the outer perimeter of the first portion 160. The second portion 164 can include one or more fixation points 172 moveably coupling the charging assembly 108 to the support frame 104, as described in more detail with reference to FIGS. 6A and 6B.

Figure 4B:
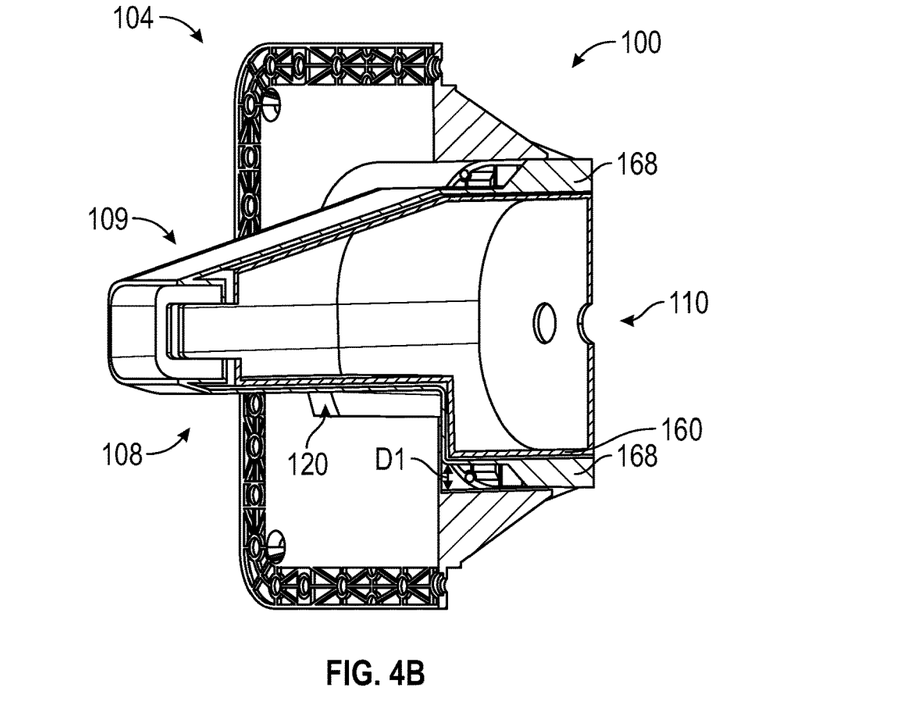
FIG. 4B is a side perspective cross-sectional view of the charging interface of FIG. 1A in a nested configuration.
Figure 4C:
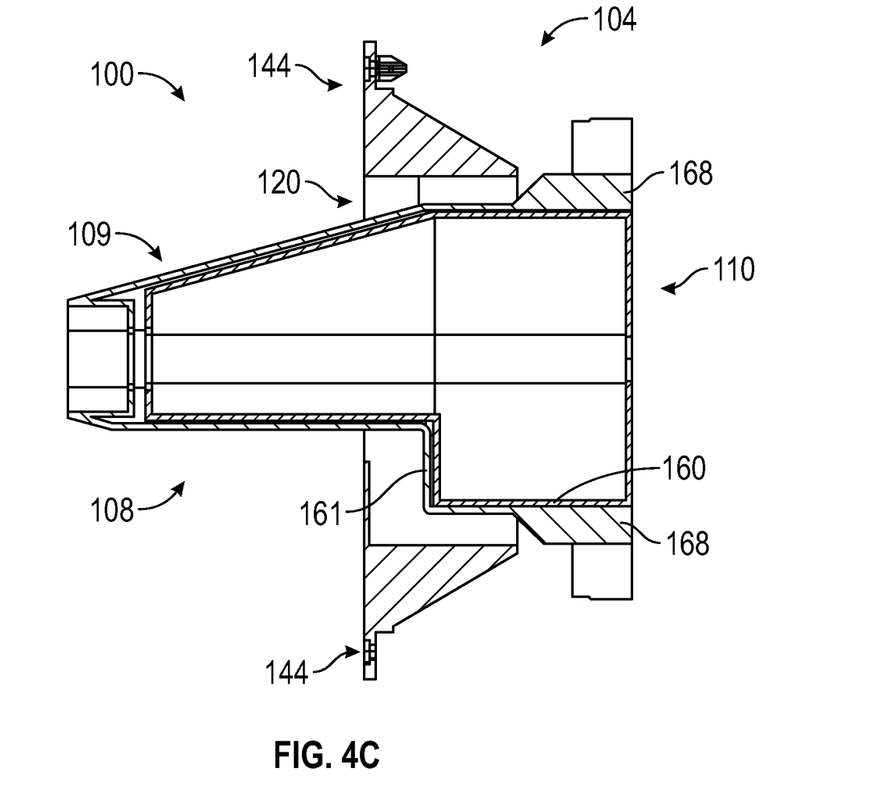
FIG. 4C is a side perspective cross-sectional view of the charging interface of FIG. 1A in a floating configuration.

FIGS. 4A-4B are cross-sectional views of the charging interface 100 in a nested or fixed configuration. FIG. 4C is a cross-section view of the charging interface 100 in a floating configuration. As shown the charging assembly 108 is positioned at least partially within the opening 120 of the support frame 104. The charging port 109 is disposed such that the proximal end extends past the front surface 128 of the support frame 104. The first portion 160 of the fixation member 110 can also be at least partially disposed within the opening 120 of the support frame 104. The second portion 164 of the fixation member 110 can remain outside the opening 120. Different portions of the charging assembly 108 can be positioned within or outside of the support frame 104 depending on the current positioning of the charging interface 100 and whether a robot has engaged the charging port 109.

As shown, the opening 120 of the support frame 104 is larger than the charging port 109 and the first portion 160 of the fixation member 110. As such the inner surface 124 of the opening 120 and the outer surface of the charging port 109 and/or the first portion 160 of the fixation member 110 define a gap D1 that extends circumferentially around the charging port 109. The gap D1 can extend entirely around the outer surface of the charging port 109 and/or the first portion 160 of the fixation member 100, thus allowing the charging assembly 108 to move when in a floating configuration as described herein. The gap D1 can be sized to a predetermined distance to control and/or limit the range of motion (e.g., translation, rotation) of the charging assembly 108 relative to the support frame 104 when in a floating configuration. The gap D1 can vary depending on the amount of movement that is desired. For example, the gap D1 can be between about 5 mm and about 15 mm. As the gap D1 increases in size, the range of motion increases. As the gap D1 decreases in size, the range of motion decreases. In some embodiments, the gap D1 has a uniform width between the inner surface 124 of the opening 120 and the charging assembly 108 (e.g., along the length of the opening 120 in the support frame 104). In some embodiments, the gap D1 has a width that varies between the inner surface 124 of the opening 120 and the charging assembly 108 (e.g., along the length of the opening 120 in the support frame 104).

When in a nested or fixed configuration, as shown in FIGS. 4A and 4B, the charging assembly 108 is fixed such that motion is inhibited (e.g., substantially reduced or prevented). The charging assembly 108 can be centered and aligned within the opening 120 of the support frame 104 and fixed relative to the support frame 104. The ribs 168 are disposed within corresponding recesses to inhibit (e.g., substantially reduce or prevent) the motion of the charging assembly 108 relative to the support frame 104. The vertical surface 161 of the first portion 160 of the charging assembly 108 can engage the support frame 104 in the nested configuration to also inhibit (e.g., substantially reduce or prevent) the motion of the charging assembly 108 relative to the support frame 104. The length of the ribs 168 can impact the required distance the charging assembly 108 is moved distally relative the support frame 104 to transition to a floating position. For example, longer ribs 168 may require more distal movement to disengage the charging assembly 108 from the support frame 104 as described herein. In some embodiments, the ribs 168 can be between about 5 mm and about 15 mm. In embodiments with ribs 168 of a length of 10 mm, the distal movement needed to disengage the charging assembly 108 can be between about 15 mm to about 25 mm. The distal movement needed may exceed the length of the ribs 168 to ensure complete disengagement from the corresponding recesses.

When a robot engages the charging interface 100 the ribs 168 disengage the recesses thus transitioning the charging interface 100 to a floating configuration, as shown in FIG. 4C. The charging port 109 is pushed toward and/or into the opening 120 of the support frame 104 which in turn pushes the ribs 168 out of their corresponding recesses. When in a floating configuration, the charging assembly 108 is capable of motion. The charging assembly 108 is capable of translational motion when in a floating state as shown in FIG. 5A and the charging assembly 108 is capable of rotational motion when in a floating state, as shown in FIG. 5B. The charging assembly 108 can move side-to-side, up-and-down, and diagonally when in a floating state. The ability to move can accommodate any variation or misalignment between the robot and the charging interface 100, thereby allowing the robot to mate with the charging interface 100, resulting in a reliable connection.

Figure 6A:
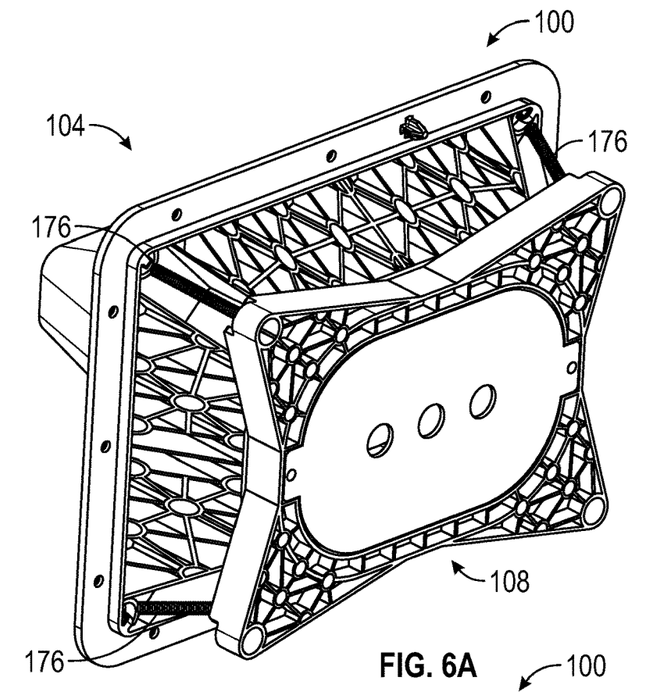
FIG. 6A is a rear perspective view of the charging interface of FIG. 1A with the charging interface in a nested configuration.
Figure 6B:
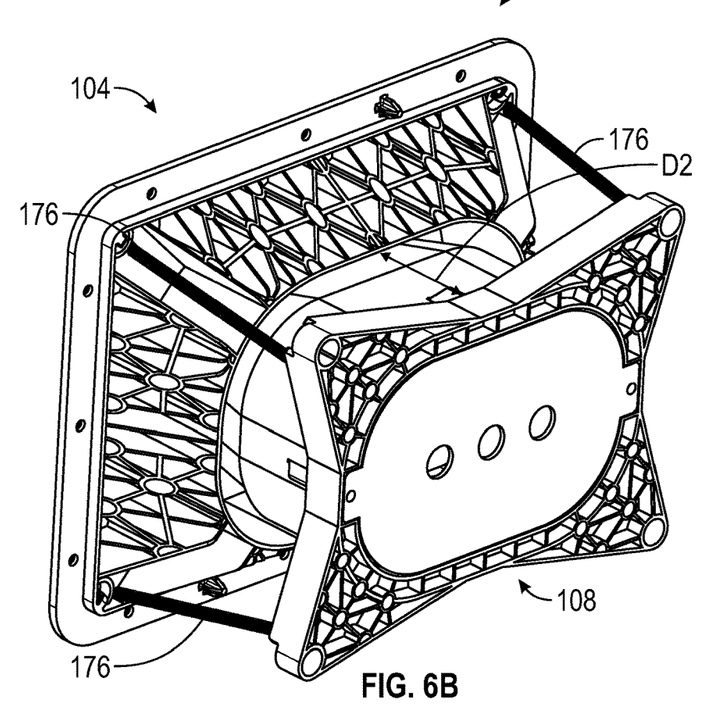
FIG. 6B is a rear perspective view of the charging interface of FIG. 1A with the charging interface in a floating configuration.

FIGS. 6A and 6B are rear perspective views of the charging interface 100 in nested and floating configurations, respectively. The positioning of FIG. 6A corresponds to the cross-sectional view of FIG. 4A while the positioning of FIG. 6B corresponds to the cross-sectional view of FIG. 4C. As shown, the support frame 104 and the charging assembly 108 can be moveably coupled to each other such that the charging interface 100 can transition between a nested or fixed configuration (FIG. 6A) and a floating configuration (FIG. 6B). The charging interface 100 transitions to a floating configuration when a robot engages the charging port 109. The robot engaging the charging port 109 can move the charging assembly 108 a distance D2 away from the support frame 104. This will disengage the ribs 168 from their corresponding recesses allowing motion of the charging assembly 108 as described herein.

In some embodiments, the charging assembly 108 can be moveably coupled to the support frame 104 via one or more springs 176 (e.g., coil springs). The springs 176 can be spaced around the charging assembly 108 and the support frame 176. In some embodiments, four springs 176 can be used and they can be positioned in corners of the charging assembly (for example, corners of the fixation members 110) and corners of the support frame 104. In the illustrated implementation, four springs 176 interconnect the charging assembly 108 and the support frame 104. A first end of each spring 176 can connect to a fixation point 172 and a second end of the spring 176 can connect to the through holes or fixation points 132 of the support frame 104. The springs 176 can bias the charging port 109 and/or charging assembly 108 toward the support frame 104, thus returning the charging assembly 108 to a nested configuration when the robot disengages the charging interface 100. While springs 176 are depicted, other mechanisms for moveably coupling the charging assembly 108 and support frame 104 can be used. For example, resilient arms, pneumatic pistons, hydraulic pistons, elastomers and/or diaphragms can be used to moveably couple the charging assembly 108 to the support frame 104. The type of connection used can impact the range of motion of the charging assembly 108 when in a floating position. In some examples, one or more actuators can couple charging assembly 108 and support frame 104 such that the motion of charging assembly 108 relative to support frame 104 is controllable.

Figure 7A:
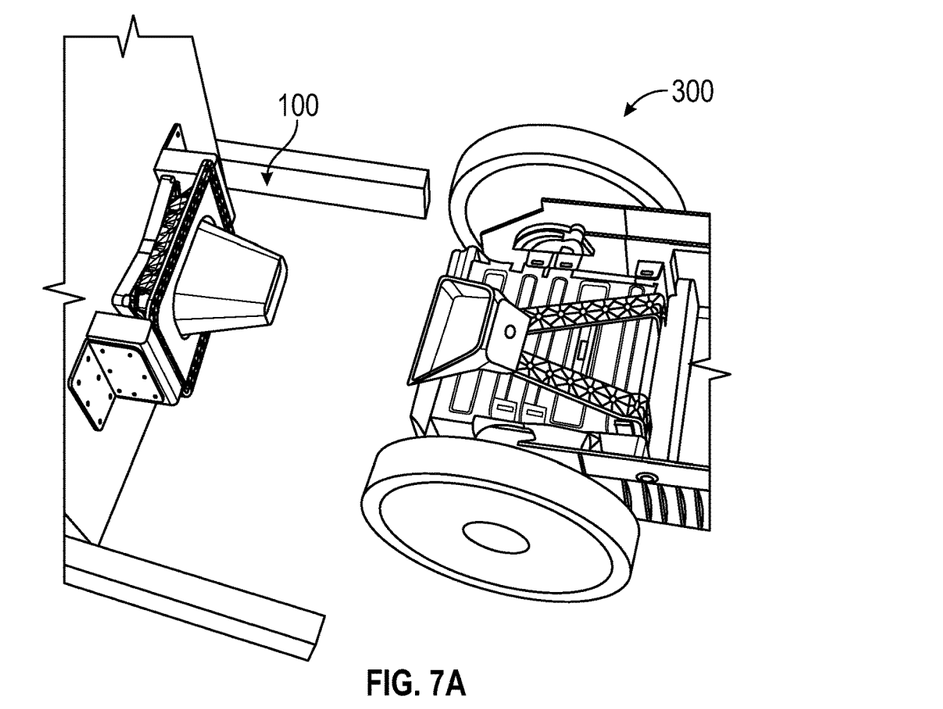
FIGS. 7A-7D illustrate a robot engaging the charging interface of FIG. 1A.
Figure 7B:
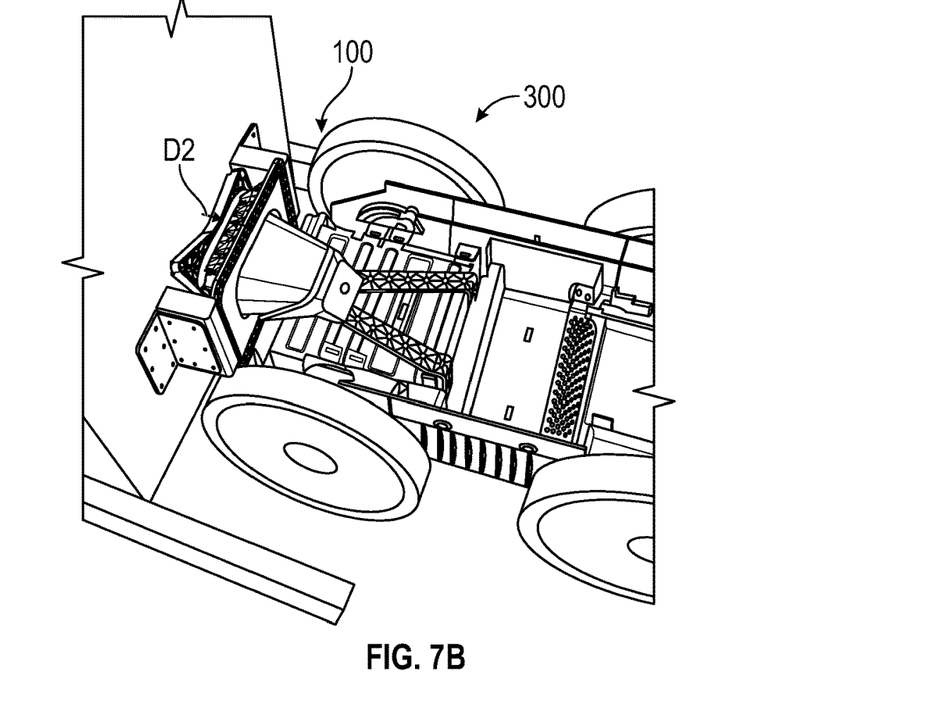
Figure 7C:
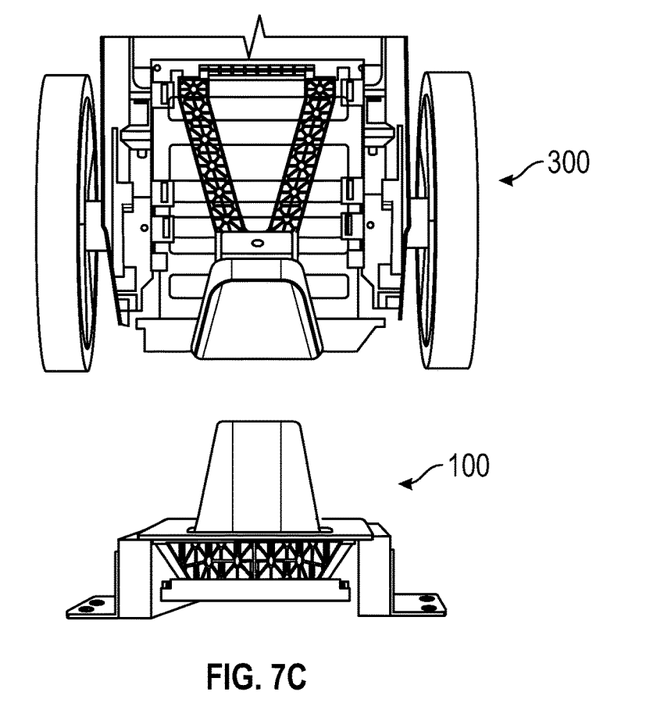
Figure 7D:
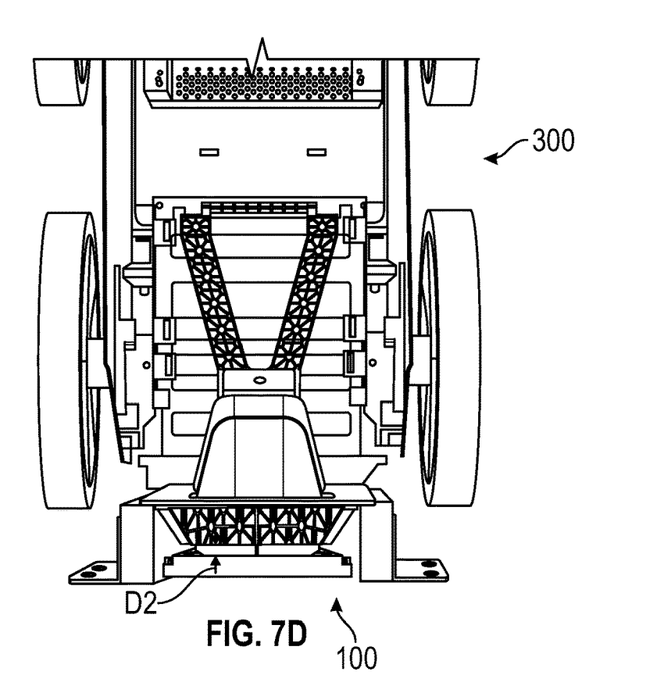

FIGS. 7A-7D illustrate a robot 300 engaging the charging interface 100. As shown in FIGS. 7A and 7C the robot 300 is approaching the charging interface 100. At this point, the charging interface 100 is in a nested configuration such that the charging port 109 and/or charging assembly 108 is centered and aligned with the opening 120 of the support frame 104, and fixed relative to the support frame 104. As shown in FIGS. 7B and 7D the robot 300 has engaged the charging interface 100. The engagement between the robot 300 and the charging interface 100 can move the charging port 109 and/or charging assembly 108 distally relative to the support frame 104 such that the charging port 109 and/or assembly 108 is in the floating configuration and free to translate and rotate relative to the support frame 104. The robot 300 engaging the proximal end of the charging port 109 can disengage the charging port 109 and/or charging assembly 108 from the support frame 104 by pushing the charging port 109 relative to the support frame 104 such that that charging port 109 is in a floating position relative to the support frame 104, as described herein. When the robot 300 disengages the charging interface 100, the charging assembly 108 can return to a fixed or nested position within the support frame 104 (e.g., via the force applied by the springs 176).

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure.

The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Of course, the foregoing description is that of certain features, aspects and advantages of the present invention, to which various changes and modifications can be made without departing from the spirit and scope of the present invention. Moreover, the devices described herein need not feature all of the objects, advantages, features and aspects discussed above. Thus, for example, those of skill in the art will recognize that the invention can be embodied or carried out in a manner that achieves or optimizes one advantage or a group of advantages as taught herein without necessarily achieving other objects or advantages as may be taught or suggested herein. In addition, while a number of variations of the invention have been shown and described in detail, other modifications and methods of use, which are within the scope of this invention, will be readily apparent to those of skill in the art based upon this disclosure. It is contemplated that various combinations or subcombinations of these specific features and aspects of embodiments may be made and still fall within the scope of the invention. Accordingly, it should be understood that various features and aspects of the disclosed embodiments can be combined with or substituted for one another in order to form varying modes of the discussed devices.

What is claimed is:

1. A charging interface for a robot, comprising:
a support frame extending between a proximal end and a distal end and having an opening that extends through the support frame and defines and inner surface of the support frame; and
a charging assembly movably coupled to the support frame via one or more springs coupled to the support frame and to a distal portion of the charging assembly, a linear portion of the charging assembly extending at least partially through the opening, an outer surface of the linear portion spaced from the inner surface to define a circumferential gap therebetween, the charging assembly comprising:
   a charging port at a proximal end of the charging assembly, and
   a fixation member configured to center and align the charging assembly relative to the support frame via a plurality of ribs on one of the fixation member and the inner surface of the support frame that releasably engage a plurality of recesses on the other of the fixation member and the inner surface of the support frame,
wherein the charging assembly is movable relative to the support frame between a nested position where the charging assembly is centered and aligned within the opening and a distal portion of the charging assembly engages the distal end of the support frame, and a floating position where the charging assembly is moved distally relative to the support frame so that the distal portion of the charging assembly is spaced from the distal end of the support frame and so that the charging assembly is free to translate and rotate relative to the support frame.

2. The charging interface of claim 1, wherein the support frame comprises a front plate and an enclosed area extending from a rear surface of the front plate, the opening extending from the front plate therethrough.

3. The charging interface of claim 1, wherein a first end of the charging port extends past a front surface of the support frame.

4. The charging interface of claim 1, wherein the charging port tapers toward a proximal end of the charging port.

5. The charging interface of claim 1, wherein the circumferential gap extends circumferentially about the charging port.

6. A charging interface for a robot, comprising:
a support frame having an opening extending therethrough; and
a charging port movably coupled to the support frame and comprising a first portion extending at least partially through the opening, an outer surface of the first portion being spaced from the opening by a gap,
wherein the charging port is movable relative to the support frame between a nested position where the charging port is centered and aligned within the opening and fixed relative to the support frame, and a floating position where the charging port is moved distally relative to the support frame so that the charging port is free to translate and rotate relative to the support frame, the charging port being biased toward the nested position, and
wherein one of the support frame and the charging port comprises a plurality of ribs configured to align with a plurality of recesses of the other of the support frame and the charging port.

7. The charging interface of claim 6, wherein the charging port is moveably coupled to the support frame via one or more springs coupled to the support frame and to a distal portion of the charging port.

8. The charging interface of claim 7, wherein the charging port is moveably coupled to the support frame via four springs, a first end of each spring positioned near a different corner of the support frame.

9. The charging interface of claim 6, wherein the charging port tapers toward a proximal end of the charging port.

10. The charging interface of claim 6, wherein the gap extends circumferentially about the charging port.

11. The charging interface of claim 6, wherein the charging interface is positioned in a vertical orientation.

12. The charging interface of claim 6, wherein the charging interface is positioned in a horizontal orientation.

13. The charging interface of claim 6, wherein the charging port is moveably coupled to the support frame via at least one linear actuator.

14. The charging interface of claim 6, wherein when the robot engages the charging interface the charging port is moved a predetermined distance from the support frame.

15. The charging interface of claim 14, wherein the predetermined distance is between about 15 mm and about 25 mm.

16. A method of operating a charging interface for a robot, comprising:
receiving a force on a proximal end of a charging port of the charging interface, the proximal end of the charging interface extending proximally of a support frame that movably supports the charging interface; and
disengaging the charging port of the charging interface from the support frame by pushing the charging port relative to the support frame with said force so that the charging port is in a floating position relative to the support frame where the charging port is free to translate and rotate relative to the support frame,
wherein disengaging the charging port of the charging interface from the support frame further comprises disengaging a plurality of ribs of one of the support frame and the charging port from a plurality of recesses of the other of the support frame the charging pot.

17. The method of claim 16, wherein disengaging the charging port of the charging interface from the support frame further comprises moving the charging port a predetermined distance from the support frame.

18. The method of claim 16, wherein pushing the charging port includes pushing against a biasing force configured to move the charging port to a nested position relative to the support frame where the charging port is centered and aligned within an opening of the support frame and fixed relative to the support frame.

* * * * *

UNITED STATES PATENT AND TRADEMARK OFFICE
CERTIFICATE OF CORRECTION

| | | Page 1 of 1 |
|---|---|---|
| PATENT NO. | : 12,483,048 B1 | |
| APPLICATION NO. | : 17/934963 | |
| DATED | : November 25, 2025 | |
| INVENTOR(S) | : Samrin Sing | |

It is certified that error appears in the above-identified patent and that said Letters Patent is hereby corrected as shown below:

In the Claims

Column 10, Claim 16, Line 50, delete "charging pot." and insert -- charging port. --.

Signed and Sealed this
Twenty-seventh Day of January, 2026

John A. Squires
*Director of the United States Patent and Trademark Office*